US006907323B2

(12) United States Patent
Avenel

(10) Patent No.: US 6,907,323 B2
(45) Date of Patent: Jun. 14, 2005

(54) VEHICLE EQUIPPED WITH A SYSTEM FOR REMOTE CONTROL OF AN OPENING PANEL AND SYSTEM FOR PRODUCING SUCH CONTROL

(75) Inventor: Jean-Jacques Avenel, Chennevieres (FR)

(73) Assignee: Valeo Electronique, Creteil (FR)

( * ) Notice: Subject to any disclaimer, the term of this patent is extended or adjusted under 35 U.S.C. 154(b) by 100 days.

(21) Appl. No.: 10/018,812

(22) PCT Filed: Apr. 25, 2001

(86) PCT No.: PCT/FR01/01261

§ 371 (c)(1), (2), (4) Date: Mar. 6, 2002

(87) PCT Pub. No.: WO01/81694

PCT Pub. Date: Nov. 1, 2001

(65) Prior Publication Data

US 2003/0105559 A1 Jun. 5, 2003

(51) Int. Cl.[7] .............................................. G06F 17/00

(52) U.S. Cl. .............................. 701/2; 701/49; 701/36; 340/870.16; 340/425.5; 160/188; 160/310

(58) Field of Search ........................... 701/2, 49, 1, 36; 340/870.01, 870.03, 870.05, 870.02, 870.16, 825.72; 160/188, 310; 49/26, 31

(56) References Cited

U.S. PATENT DOCUMENTS 3,628,394 A * 12/1971 Keatinge et al. ....... 74/471 XY
4,997,053 A * 3/1991 Drori et al. ................. 180/287
5,721,646 A * 2/1998 Catlin et al. ................ 359/865
5,971,325 A * 10/1999 Gold et al. ................ 244/180
5,988,645 A * 11/1999 Downing .................... 273/348
6,173,532 B1 * 1/2001 Beausoleil .................... 49/199
6,333,631 B1 * 12/2001 Das et al. ................... 324/326
2002/0032510 A1 * 3/2002 Turnbull et al.
2002/0099487 A1 * 7/2002 Suganuma et al.
2003/0018478 A1 * 1/2003 Mays ......................... 704/275

FOREIGN PATENT DOCUMENTS

EP 0 735 219 A2 10/1996
EP 0 770 749 A2 5/1997
FR 2 733 783 11/1996

* cited by examiner

*Primary Examiner*—Olga Hernandez
(74) *Attorney, Agent, or Firm*—Liniak, Berenato & White

(57) ABSTRACT

The invention concerns a vehicle comprising a system enabling a user to control remotely an actuating mechanism (1) connected to an opening panel, in particular a boot opening panel (8). The control system comprises means, equipping the vehicle, for controlling at least an action of the actuating mechanism, according to the movement of an object, such as a hand, vertically in a delimited control zone adjacent to the opening panel. Said movement is determined from signals obtained from at least a movement sensor (7) placed on or proximate to the opening panel and whereof the radiation pattern if fixed to delimit the control zone.

14 Claims, 3 Drawing Sheets

VEHICLE EQUIPPED WITH A SYSTEM FOR REMOTE CONTROL OF AN OPENING PANEL AND SYSTEM FOR PRODUCING SUCH CONTROL

BACKGROUND OF THE INVENTION

1. Field of the Invention

The invention relates to vehicles, in particular motor vehicles, which are equipped with systems making it possible to act remotely at the level of at least one of their openable-panels, for example at the level of a trunk openable-panel, so as to trigger the opening or closing thereof. It also relates to systems allowing the implementation of such control.

2. Description of the Related Art

There are, at present, a certain number of motor vehicles equipped with "hands free" access systems allowing a user to act on a vehicle, from outside this vehicle, if this user carries an appropriate identifier, of the transponder type, which is recognized by a transmitter/receiver recognition device with which the vehicle is equipped, when it lies in a specified geographical zone in the vicinity of the vehicle. Such an access system acts, for example, on the mechanism for locking/unlocking the locks of the openable-panels of a motor vehicle, in such a way as to allow these openable-panels to be opened by one or more users as soon as the recognition device, which the vehicle comprises, has detected the presence at a suitable distance of a specified identifier.

Automatic opening of all the openable-panels of a vehicle and in particular of a motor vehicle, by the access system, in addition to the unlocking of the locks, is not generally envisaged in so far as complete simultaneous opening such as this of all the openable-panels is not necessarily beneficial in the case of motor vehicles. Such opening could moreover be a source of risk for a vehicle with openable-panels, of the leaf type, and for whatever was then in its environment. On the other hand, it may be convenient for a user to be able to control the opening and/or the closing of one of the openable-panels, for example a side-opening door or a trunk openable-panel, without having to operate a control member. This is beneficial, for example, in respect of a user who wishes to put a load which he is carrying between his hands into a vehicle without having to set this load down in order to open the openable-panel manually, or alternatively to close an openable-panel, when his hands are full.

SUMMARY OF THE INVENTION

It is then necessary to envisage a means allowing the user to trigger the opening and/or the closing of an openable-panel, as he desires, as soon as he fulfills the conditions necessary to obtain such opening.

A known remote control system makes it possible to instruct automatic opening of a trunk openable-panel, it comprises sensors which are disposed in the vicinity of the trunk, for example on either side of the registration plate adjoining this trunk, and which are able to detect the presence of a hand in proximity. The instruction for opening the trunk is triggered by the successive detection of the hand of a user in front of each of the sensors. This detection of successive presences of a hand in front of each of the detectors during the to-and-fro control motion is envisaged so as to limit the risks of triggering by a user, or even by a third party, making movements at the level of the sensors, without intending to instruct opening. On the other hand, the triggering of an instruction by a motion of this kind is not necessarily practical, in particular when the user is carrying a load which is difficult to handle, for example because of its bulk or its weight.

The invention therefore proposes a vehicle, in particular a motor vehicle which comprises a control system allowing a user to act remotely on an actuator mechanism secured to an openable-panel, such as a trunk openable-panel or a door.

According to one characteristic of the invention, this control system comprises means, at the level of the vehicle, for controlling by way of a motion sensor, at least one action of the actuator mechanism, when a motion is detected by way of a motion sensor, along a favored axis of detection of motion of this sensor and characterized in that this motion corresponds to a predetermined motion.

According to a variant of the invention, the control system comprises means, at the level of the vehicle, for controlling at least one action of the actuator mechanism, on the basis of the signals produced by motion sensors, when one and the same motion detected by way of these sensors along their respective favored axes is manifested as a specified motion along a resultant axis whose orientation is dependent on the achieved combination of sensors.

According to a variant of the invention, the control system comprises means by way of which the speed of motion, along the favored axis of the sensor or along the resultant axis of the sensors of the control system, which speed is determined on the basis of the signals supplied by each sensor, is utilized for the control of the actuator mechanism, in the event of the detection of a motion.

According to a variant of the invention, the control system comprises means by way of which the distance traveled, along the favored axis of the sensor or along the resultant axis of the sensors of the control system, which is determined on the basis of the signals supplied by each sensor, is utilized for the control of the actuator mechanism, in the event of the detection of a motion, in particular, for travel or angular opening control purposes, at the level of the actuator mechanism.

According to the invention, the orientation of the sensor or sensors on the vehicle is fixed in such a way that the favored axis of each sensor of the control system which is associated with the actuator mechanism of an openable-panel is oriented so as to detect motions occurring in at least one of the directions corresponding respectively to the direction of opening or of closing of the openable-panel.

According to the invention, the vehicle comprises an openable-panel actuator mechanism which is an openable-panel opening and/or closing electromechanical or mechanical assembly.

According to a variant of the invention, the vehicle comprises an openable-panel control system which is associated with a "hands free" access device which controls a mechanism for locking/unlocking at least one lock of an openable-panel of the vehicle.

According to a variant of the invention, the openable-panel control system acts on an actuator mechanism ensuring the opening and/or the closing of an openable-panel, this control system comprising one or more motion sensors disposed on the openable-panel or in proximity to the openable-panel on the vehicle.

According to a variant of the invention, the control system comprises one or more motion sensors, of the ultrasound or microwave frequency signal transmitter/receiver type.

According to a variant of the invention, the control system comprises means for controlling an openable-panel actuator mechanism which are designed so as to determine the control action to be effected as a function of the direction of motion as defined on the basis of the signals supplied by the sensor or sensors, preferably on the basis of a predetermined minimum threshold value of motion.

According to a variant of the invention, the direction of the specified motion, required to control the opening or the closing of an openable-panel by an actuator mechanism under the control of the means making it possible to control this mechanism, is chosen so as to correspond to the direction of motion of opening or of closing of the openable-panel which is requested.

The invention also proposes a control system for vehicle openable-panel and in particular for trunk openable-panel of a vehicle, such as a motor vehicle, this system being devised so as to allow a user to act remotely on an actuator mechanism secured to the openable-panel in the vehicle. According to the invention this system comprises means, intended to be mounted on the vehicle, for controlling at least one action of the actuator mechanism, as a function of the displacement of an object, such as a hand, vertically in a delimited control zone adjoining the openable-panel, this displacement being determined on the basis of the signals supplied by at least one motion sensor, of the motion detection signals transmitter/receiver type, which the system comprises and which is intended to be placed in proximity to the openable-panel, the radiation pattern of the or of each of the sensors being fixed in such a way as to delimit the control zone in the vicinity of the openable-panel.

The invention, its characteristics and its advantages are detailed in the description which follows in conjunction with the figures mentioned below.

DETAILED DESCRIPTION OF THE PREFERRED EMBODIMENTS

Figure 1:
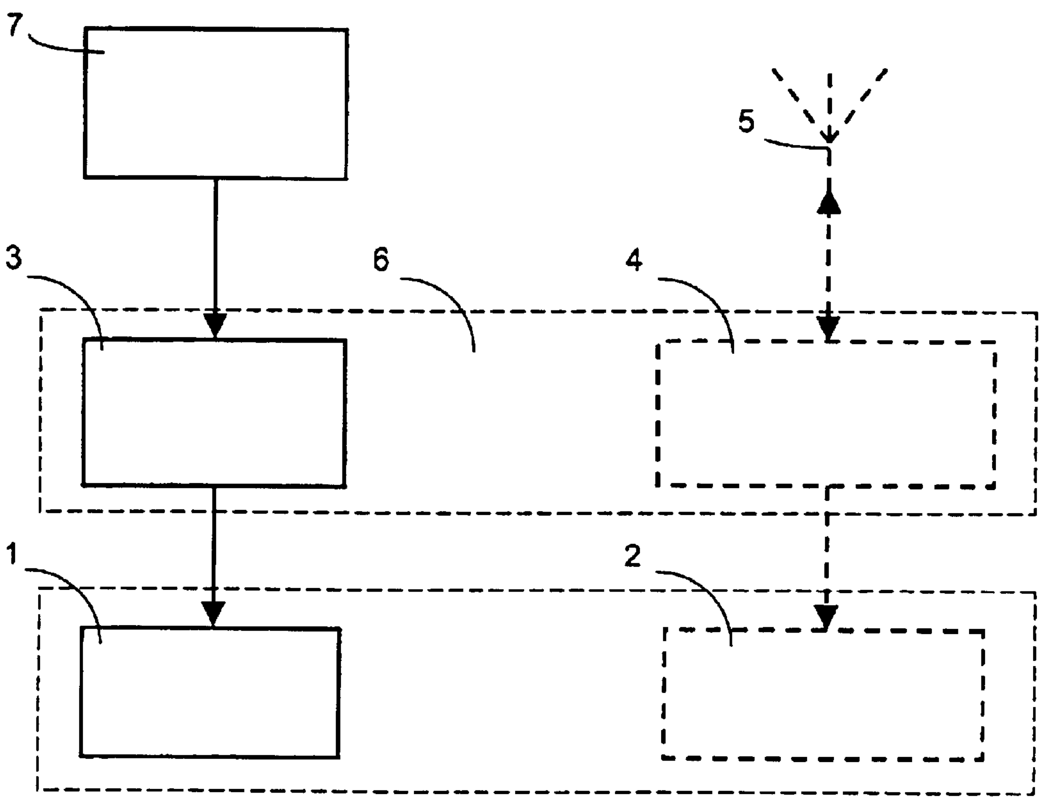
FIG. 1 depicts a diagram of a control system intended to allow a user to act remotely at the level of a mechanism secured to an openable-panel of a vehicle, this control system, according to the invention, here being assumed to be associated with an access control system, such as a "hands free" system.

A basic diagram depicting the essential constituent elements of a control system allowing a user to act remotely on an actuator mechanism, secured to an openable-panel of a vehicle, is depicted, by way of example, in FIG. 1. Associated therewith is a "hands free" access system, as mentioned above, it being understood that this preferably envisaged association, is not, however, indispensable.

The control system, according to the invention, is designed to allow a user to act on an actuator mechanism 1 of an openable-panel of a vehicle, not represented in this figure.

The invention is intended, in particular, to be implemented on a motor vehicle and at the level of an openable-panel, for example a trunk openable-panel. It is, of course, applicable to the other openable-panels which the vehicle may comprise.

The actuator mechanism 1, secured to the openable-panel which is considered here, is for example a mechanism making it possible to ensure the opening and/or the closing of the openable-panel. Here it is assumed to be able to act in response to at least one control action executed by a user, which action is sent to it through control logic 3. As known, the response of the actuator mechanism to a control may be obtained mechanically, for example by involving one or more springs, or electromechanically, for example by involving an electric motor.

In a variant embodiment, the actuator mechanism 1 is associated with a mechanism for locking/unlocking 2 a lock of the openable-panel to which it is assigned, in such a way as to allow the opening of the openable-panel, when its lock is unlocked and, possibly, to allow its closure, before a locking of the openable-panel in the closed position is carried out. As is known, the operations of locking and unlocking at least one openable-panel of a vehicle may be controlled by way of an access control logic unit with which the vehicle is equipped. This unit reacts for example to an action carried out by the user by means of a control member or remote control member. It may possibly involve the presence of a specified user identifier at the level of the vehicle, in particular, if the latter is equipped with a "hands free" access system as mentioned above and as envisaged in FIG. 1. In the example depicted and according to a known embodiment, the identifier allocated to a user is of the transponder type, and it is able to transmit an identification signal in response to a specified interrogation signal. This interrogation signal is transmitted under the supervision of control logic 4, furnished with identifier recognition means, with which the vehicle is equipped. The transmission/reception device is here symbolized by the antenna 5 which is assumed to be linked to the logic 4 by a transmitter/receiver, not represented.

By way of example and as envisaged above, it is assumed here that the access control logic 4 makes it possible to act on the locking/unlocking mechanism 2 and that it cooperates with the control logic 3 acting on the actuator mechanism 1. These two logic facilities are possibly combined into a logic assembly 6, as known to the person skilled in the art, their cooperation is effective, during operations where the mechanisms 1 and 2 are involved.

According to the invention, there is provision for the control logic 3, which makes it possible to act on the actuator mechanism 1 secured to an openable-panel, to be furnished with means allowing it to react as a function of the motion of an object, and in particular of a hand, in a delimited control zone adjoining the openable-panel.

Figure 2:
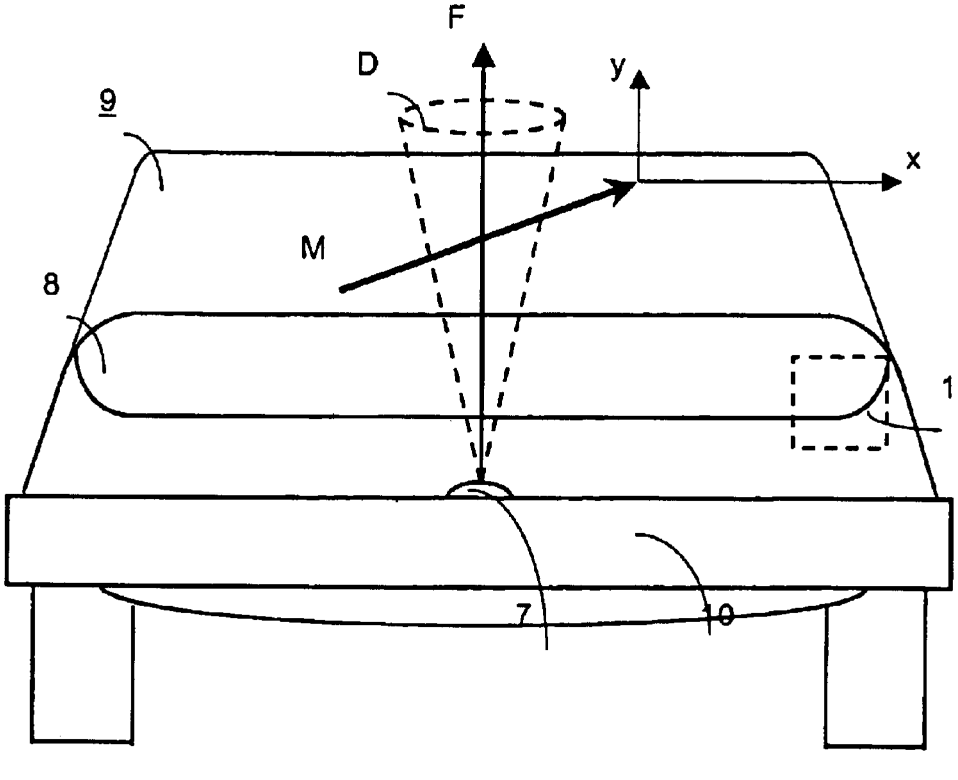
FIG. 2 depicts a basic diagram relating to the positioning and to the operation of a sensor of a control system, according to the invention, this system being associated with a trunk openable-panel on a vehicle, in a nonlimiting exemplary embodiment.
Figure 4:
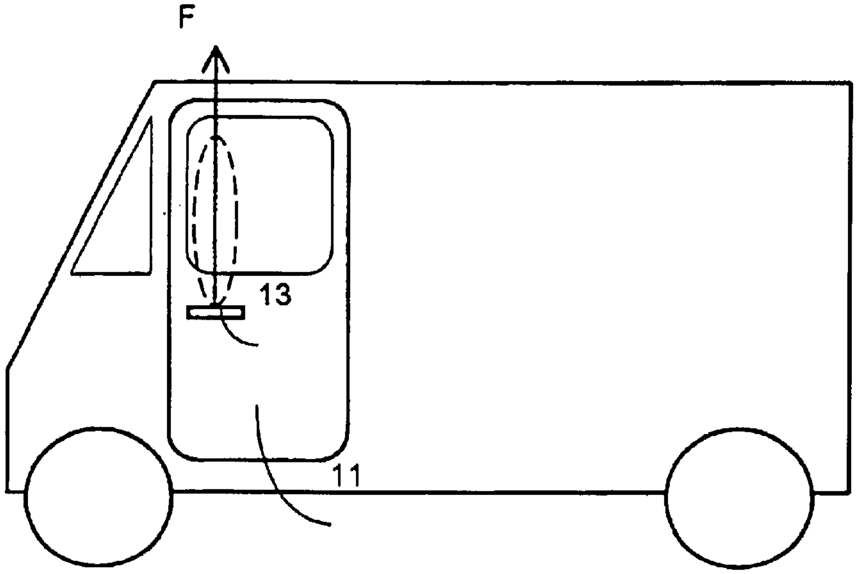
FIGS. 4 and 5 respectively depict a basic diagram relating to a second variant implementation of the invention, as illustrated in FIG. 2.
Figure 6:
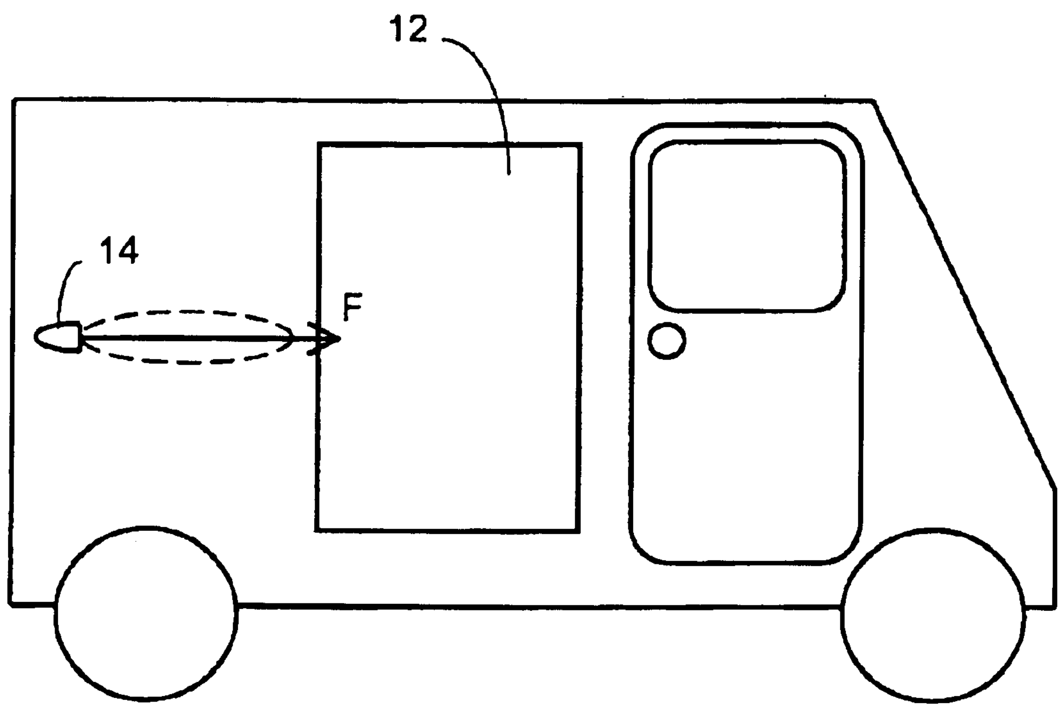
FIG. 6 depicts a basic diagram relating to a third variant implementation of the invention, as illustrated in FIG. 2.

The motion is determined on the basis of signals which are obtained from at least one motion sensor 7 which is, for example, placed on the vehicle in proximity to the openable-panel, as illustrated in FIGS. 2 and 6, or else on the openable-panel itself, as depicted in FIG. 4. The sensor or sensors may thus be placed above or below the level of the openable-panel on the vehicle and for example on a bumper near this openable-panel, when the latter is a trunk openable-panel. A positioning on one side of the vehicle, in proximity to a trunk openable-panel, may thus be envisaged so as to allow control of this openable-panel, when only side access is possible, because of the vehicle parking conditions.

The sensor 7, envisaged above, comprises, for example, means allowing it to transmit signals, for evaluation purposes, and to recover them, when they are reflected by an element constituting a reflector which is then situated in the field of the sensor. This reflector element can in particular be a hand of a user. The sensor 7 is, for example, constructed around a standard circuit for transmitting/receiving ultrasonic signals or a circuit for transmitting/receiving microwave frequency signals. It is assumed to possess a favored axis of detection of motion F, such as schematized in FIG. 2. A processing of the motion evaluation signals, received by the sensor envisaged above, is performed at the level of a logic facility of this sensor or of the control logic 3 with a view to determining the direction and, for example, the speed or the distance traveled in respect of a detected motion. This is achieved by implementing logic means known to the person skilled in the art. These means are, for example, located at the level of a computation unit of the control logic 3, duly programmed.

The control system, according to the invention, takes into account the motion of a reflector element over the path followed by the waves emitted by the sensor 7, in a delimited control zone. As known, the delimitation of this zone is dependent on the radiation pattern envisaged when designing the sensor 7, this pattern is here assumed to be chosen of conical shape and oriented along an axis F which is a favored axis of detection for the sensor. The cone of emission of the sensor 7 is designed to be narrow and of small extent lengthwise so as to ignore the motion of an object, forming a screen, in particular above the vehicle, a distance away which may not correspond to the position of a hand of a user acting for control purposes.

An example of positioning the sensor 7 for an openable-panel 8, of the trunk openable-panel type of a vehicle 9, is illustrated in FIG. 2. The sensor 7 is disposed therein below the level of the openable-panel 8 on the vehicle and, for example, in the middle of the vehicle on the bumper 10, near this openable-panel, the latter here being assumed to open through an upward tilting motion. The radiation pattern D of the sensor is vertically oriented and it is assumed to cover a narrow zone, of conical shape spreading upward and adjoining the trunk openable-panel. Of course, the orientation of the beam emitted by the sensor manifested by the radiation pattern may be modified, according to the forms and orientation of the part of the vehicle where the openable-panel to be remotely controlled is situated, as well as those of this openable-panel. In particular, it is conceivable to have a beam oriented in the reverse direction to that depicted, for example if the sensor 7 is fixed on the top of the vehicle, above a vertical or quasi-vertical openable-panel, and if it defines a control zone situated below it which extends over at least part of the height of this openable-panel. The sensor can also be disposed in such a way that the favored axis F of the sensor is only approximately vertical. Specifically, as shown diagrammatically in FIG. 1, it is the vertical component “y” of the motion of the object forming a screen to the waves emitted by the sensor 7 which is taken into account by the logic 3, for determining whether the component of the motion along the vertical axis corresponds to a predetermined motion characteristic of a control action executed by a user, as shown diagrammatically in FIG. 2, for a motion of a screen object which is symbolized by an arrow M, in a vertical plane x, y.

In a given form of implementation, there is provision for the hand motion making it possible to control the upward opening of the trunk openable-panel 8, shown diagrammatically in FIG. 2, to correspond to a motion carried out upward in the control zone of vertical orientation delimited by the sensor 7. This sensor is assumed here to be placed at the upper part of the bumper 10. The carrying out of such a motion does not correspond to a customary action of a user at this level, in the absence of a control system according to the invention. It is manifested as a vertical component along the favored axis of the sensor 7 which is taken into account if it corresponds to a predetermined motion, along this axis.

A hand motion in the direction reverse to the previous may possibly be utilized to control the closing of the openable-panel by the mechanism 1, when the latter is designed to carry out such opening/closing operations.

The working of the control system according to the invention may possibly be conditioned by the detecting of a user in the vicinity of the openable-panel. This may be obtained by use of a detection system with which the vehicle is moreover equipped and, for example, of a system for detecting obstacles by ultrasound which is used as an aid to vehicle parking.

There is also provision for the cooperation of a “hands free” access system with a control system, according to the invention, at the level of a vehicle to make it possible to carry out a remote openable-panel command, by detecting a defined motion in proximity to an openable-panel, only if the access system has determined the presence in proximity to the vehicle of an authorized user having an appropriate identifier. The actions of the various detection control and access control systems mentioned above may of course be coordinated in various ways, as a function of the requirements of users, in so far as the programming of the logic facilities which supervise them is envisaged for this purpose.

Figure 3:
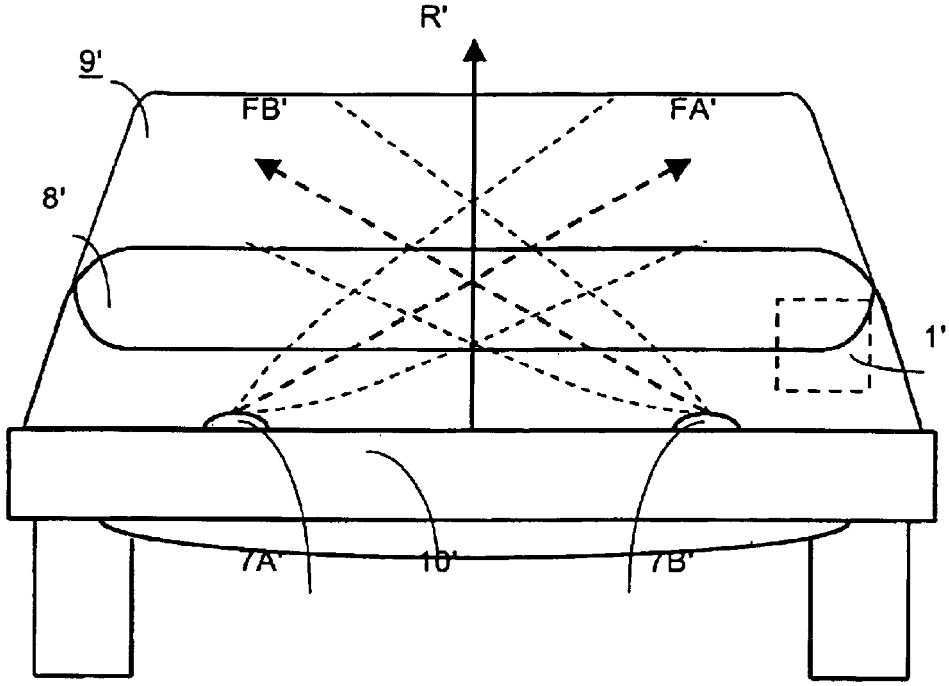
FIG. 3 depicts a basic diagram relating to a variant implementation of the invention, as illustrated in FIG. 2.

A variant embodiment is illustrated in FIG. 3, in conjunction with a trunk openable-panel 8' fitted with an actuator mechanism 1' and equipping a vehicle 9' similar to that shown diagrammatically in FIG. 2.

The vehicle 9' is equipped with a control system which corresponds functionally to that defined in conjunction with FIG. 1 and which comprises two motion sensors 7A' and 7B'. These sensors make it possible to detect a motion of a reflector element and in particular of a hand of a user, in a delimited control zone in proximity to an openable-panel, so as to determine whether this motion corresponds to a control action executed by the user. The sensors 7A' and 7B' are aligned along the openable-panel, for example, on the bumper 10' extending horizontally on the body of the vehicle below this openable-panel. They are disposed in such a way that their respective radiation patterns cut one another symmetrically along the openable-panel. In the embodiment depicted in FIG. 3, the two sensors are disposed in such a way that their respective favored axes FA' and FB', symmetrically inclined the one towards the other, are in one and the same plane, for example vertical, perpendicular to the longitudinal mid-plane of the vehicle where they cut one another. The control logic, which supervises them, is for example programmed so as to trigger a control action only if it determines that there is equality of value and identity of direction for the vertical component of speed of displacement obtained on the basis of the measurements originating from a sensor and for the component obtained on the basis of the measurements performed by the other sensor.

In a preferred embodiment, the layout of the sensors of the control system, such as 7A' and 7B', on the equipped vehicle and, in particular, the orientation of their respective favored axes FA', FB' determine the orientation of a resultant axis R' along which a motion, detected by the assembly formed by these sensors, is taken into account, so as to determine whether this motion corresponds to a predetermined control motion. This resultant axis R' is assumed to have vertical orientation in the example depicted in FIG. 3, another orientation may of course be chosen as a function of requirements, this orientation being for example oblique, or else horizontal as envisaged in respect of the embodiment illustrated in FIG. 6.

In the exemplary implementation illustrated in FIG. 3, each of the sensors associated with an openable-panel, in a control system according to the invention, performs measurements in the limited zone which is defined by its emission pattern. The control logic, which supervises these sensors, is, for example, programmed to trigger a control action, by taking as criterion one or more given conditions of speed, for the motion determined along the resultant axis R', on the basis of the signals supplied by each sensor to the logic, in the event of the detection of one and the same motion by the sensors.

Similarly in the exemplary implementation illustrated in FIG. 2, the control logic is programmed to trigger a control action by taking as criterion one or more given conditions of speed, for the motion determined along the favored axis F of the sensor 7, on the basis of the signals supplied by this sensor, in the event of the detection of a motion of an element, and in particular of a hand, by this sensor.

The triggering of an action at the level of the actuator mechanism by a control system according to the invention can for example be obtained, as soon as the speed, determined by the logic, of the motion exceeds a predetermined minimum threshold value. Openable-panel opening or closing actions may thus be obtained, according to requirements, as a function of the direction of motion noted by way of the sensor or sensors.

In another implementation, the control logic which supervises the sensor or sensors is programmed so as to utilize the distance traveled, as determined along the favored axis, such as F, of a single sensor or along the resultant axis, such as R', in the case of an assembly of sensors associated with one and the same openable-panel, as a criterion for the control of the actuator mechanism of this openable-panel. To avoid an inadvertant instruction by a user, there is provision, in one embodiment, not to trigger an instruction until the amplitude of the detected motion exceeds a specified minimum threshold value. There is also provision to utilize the criterion of distance traveled to control the angular opening of a pivoting openable-panel, such as the openable-panel 11 of the vehicle illustrated in FIG. 4, or the magnitude of its travel in the case of a sliding openable-panel, such as the openable-panel 12 of the vehicle depicted in FIG. 6, in such a way as to allow partial opening or closing. An openable-panel opening, proportional to the distance traveled by a hand in a predetermined direction of motion, may thus be obtained for a given instruction. As is known, the displacement of an element, in the control zone defined by one or more sensors, may be determined on the basis of speed measurements carried out on the basis of pulsed signals or else of Doppler type measurements carried out on the basis of continuously emitted waves. The determination of the trajectory followed during displacement may also possibly be carried out by correlation of the speed of the screen-forming object with its distance with respect to the sensor.

Figure 5:
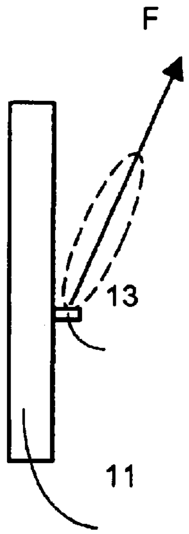

FIGS. 4 and 5 pertain to one implementation of the invention, at the level of a vehicle comprising a pivoting openable-panel 11, where there is provided a motion sensor 13 assumed to be positioned at the level of an operating handle which this openable-panel comprises. The sensor 13 is mounted in such a way that its favored axis of detection F is oriented in such a way as to detect motions performed at least almost vertically by a user for example by means of a hand in the control zone which corresponds to the radiation pattern of this sensor. In the theoretical example given, this pattern of approximately ellipsoidal or ovoidal shape is oriented upward along the favored axis F of the sensor, as shown diagrammatically, in such a way as to take into account the motions of a reflector element and in particular of a hand in a control zone situated above the sensor 13 and deviating progressively outward from the openable-panel 11, upward of this openable-panel 11 which it adjoins.

FIG. 6 pertains to an implementation of the invention, at the level of a vehicle comprising a sliding openable-panel 12 and at least one motion sensor 14, here assumed to be fixed on a vehicle side wall along which the openable-panel slides. The sensor 14 is mounted in such a way that its favored axis of detection F is oriented in such a way as to detect motions performed at least almost horizontally by a user for example by means of a hand in the control zone which corresponds to the radiation pattern of this sensor. In a preferred embodiment, the orientation of the sensor or possibly of the sensors of the control system associated with this sliding openable-panel is chosen so as to ensure detection of the motions occurring in at least one of the directions corresponding respectively to the direction of opening or of closing of the openable-panel. This serves to allow the user to control the sliding of the openable-panel by a hand motion performed, along the vehicle and in proximity to the openable-panel, in the direction of motion desired for the openable-panel.

What is claimed is:

1. A vehicle comprising a control system allowing a user to act remotely on a panel opening actuator mechanism (1) secured to an openable-panel (8) of the vehicle, said control system comprising a means (3) for controlling at least one action of the actuator mechanism, when a motion of the user is remotely sensed by way of at least one motion sensor (7), along a favored axis of detection of motion of said at least one motion sensor and wherein said motion of the user corresponds to a predetermined motion, said vehicle being a land vehicle, wherein said means (3), at the level of the vehicle, for controlling at least one action of the actuator mechanism, on the basis of the signals produced by at least two motion sensors (7A', 7B'), when a motion of the user detected by way of these sensors along their respective favored axes is manifested as a specified motion along a resultant axis (R') whose orientation is dependent on the achieved combination of said sensors, and wherein the speed of motion, along a favored axis (F) of the at least one motion sensor (7) or along the resultant axis (R') of the sensors (7A', 7B') of the control system, is determined on the basis of the signals supplied by each sensor, and the speed of motion is utilized for the control of the actuator mechanism, in the event of the detection of said motion.

2. A vehicle comprising a control system allowing a user to act remotely on a panel opening actuator mechanism (1) secured to an openable-panel (8) of the vehicle, said control system comprising a means (3) for controlling at least one action of the actuator mechanism, when a motion of the user is remotely sensed by way of at least one motion sensor (7), along a favored axis of detection of motion of said at least one motion sensor and wherein said motion of the user corresponds to a predetermined motion, said vehicle being a land vehicle, wherein said means (3), at the level of the vehicle, for controlling at least one action of the actuator mechanism, on the basis of the signals produced by at least two motion sensors (7A', 7B'), when a motion of the user detected by way of these sensors along their respective favored axes is manifested as a specified motion along a resultant axis (R') whose orientation is dependent on the achieved combination of said sensors, wherein the distance traveled, along the favored axis (F) of the at least one motion sensor (7) or along the resultant axis (R') of the sensors (7A', 7B') of the control system, which is determined on the basis of the signal supplied by each sensor, is utilized for the control of the actuator mechanism, in the event of the detection of said motion.

3. The vehicle as claimed in claim 2, in which the distance traveled such as determined, along the favored axis (F) of the sensor (7) or along the resultant axis (R') of the sensors (7A', 7B') of the control system, on the basis of the signals supplied by each sensor, in the event of the detection of said motion, is utilized for travel or angular opening control purposes, at the level of the actuator mechanism.

4. The vehicle as claimed in claim 3, in which the orientation of the sensor or sensors on the vehicle is fixed in such a way that the favored axis of each sensor of the control system which is associated with the actuator mechanism of an openable-panel is oriented so as to detect motions occurring in at least one of the directions corresponding respectively to the direction of opening or of closing of the openable-panel.

5. The vehicle as claimed in claim 4, in which the openable-panel actuator mechanism (1) which is controlled is an openable-panel opening and/or closing electromechanical or mechanical assembly.

6. The vehicle as claimed in claim 5, in which the openable-panel control system is associated with a "hands free" access device (4, 5) which controls a mechanism for locking/unlocking (2) at least one lock of an openable-panel of the vehicle.

7. The vehicle as claimed in claim 6, in which the openable-panel control system acts on an actuator mechanism (1) ensuring at least one of opening and closing of an openable-panel (8 or 8'), said control system comprising at least one motion sensor (7 or 7A', 7B') disposed on the openable-panel or in proximity to the openable-panel on the vehicle.

8. The vehicle as claimed in claim 7, in which the control system comprises one or more motion sensors, of the ultrasound transmitter/receiver type.

9. The vehicle as claimed in claim 7, in which the one or more motion sensors are of the microwave frequency signal transmitter/receiver type.

10. The vehicle as claimed in claim 9, in which the means (3 and 7 or 7A', 7B') for controlling an openable-panel actuator mechanism (2) are designed so as to determine the control action to be effected as a function of the direction of motion as defined on the basis of the signal supplied by the sensor or sensors, preferably on the basis of a predetermined minimum threshold value of motion.

11. The vehicle as claimed in claim 10, in which the direction of the specified motion, required to control the opening or the closing of an openable-panel by an actuator mechanism (2) under the control of the means (3 and 7 or 7A', 7B') which controls this mechanism, is chosen so as to correspond to the direction of motion of opening or of closing of the openable-panel which is requested.

12. A control system for an openable-panel comprising:

an openable-panel (8 or 8'), which selectively opens to gain access to an interior compartment a land motor vehicle, a panel opening actuator mechanism (2) secured to the openable-panel in the vehicle, said actuator mechanism (2) being remotely acted upon by a user, means (3 and 7 or 7A', 7B'), mounted on the vehicle, for controlling at least one action of the actuator mechanism, as a function of the displacement of an object, in a delimited control zone adjoining the openable-panel, said displacement being determined on the basis of the signals supplied by at least two motion sensor that is the resultant axis (7 or 7A', 7B'), of a microwave frequency transmitter/receiver type, which the system comprises and which is to be placed on or in proximity to the openable-panel, a radiation pattern of each of the sensors being fixed in such a way as to delimit a control zone in the vicinity of the openable-panel.

13. The system described in claim 12, wherein said object is a hand.

14. The system described in claim 12, wherein said openable panel is an access panel to a trunk of said motor vehicle.

* * * * *